United States Patent
Dauben et al.

[15] 3,670,819
[45] June 20, 1972

[54] PROCESS FOR TREATMENT OF WATER INJECTION WELLS

[72] Inventors: Dwight L. Dauben; H. R. Froning; Loyd W. Jones, all of Tulsa, Okla.

[73] Assignee: Amoco Production Company

[22] Filed: May 18, 1970

[21] Appl. No.: 38,365

[52] U.S. Cl. ................166/305 R, 166/273, 166/304
[51] Int. Cl. ...............................E21b 43/22, E21b 43/25
[58] Field of Search..................166/273, 274, 275, 305, 304

[56] References Cited

UNITED STATES PATENTS

| | | | |
|---|---|---|---|
| 3,412,791 | 11/1968 | Gogarty | 166/273 |
| 3,476,184 | 11/1969 | Davis, Jr. | 166/273 |
| 3,275,075 | 9/1966 | Gogarty et al. | 166/274 |
| 3,254,714 | 6/1966 | Gogarty et al. | 166/274 |
| 3,343,597 | 9/1967 | Gogarty et al. | 166/274 X |
| 3,467,187 | 9/1969 | Gogarty et al. | 166/273 |
| 3,467,188 | 9/1969 | Gogarty | 166/274 |
| 3,557,873 | 1/1971 | Owens | 166/274 |

*Primary Examiner*—Stephen J. Novosad
*Attorney*—Paul F. Hawley and Arthur McIlroy

[57] ABSTRACT

Water injection wells are stimulated by an oil-external micellar slug preceded and/or followed by at least one micellar (buffer) slug of a higher water content. This series of slugs is forced out into the formation by means of a water drive. There may be continuous grading from water to oil-external slug to drive water. The buffer slugs may be continuously graded in water content rather than by injecting distinctly different slug compositions.

13 Claims, 1 Drawing Figure

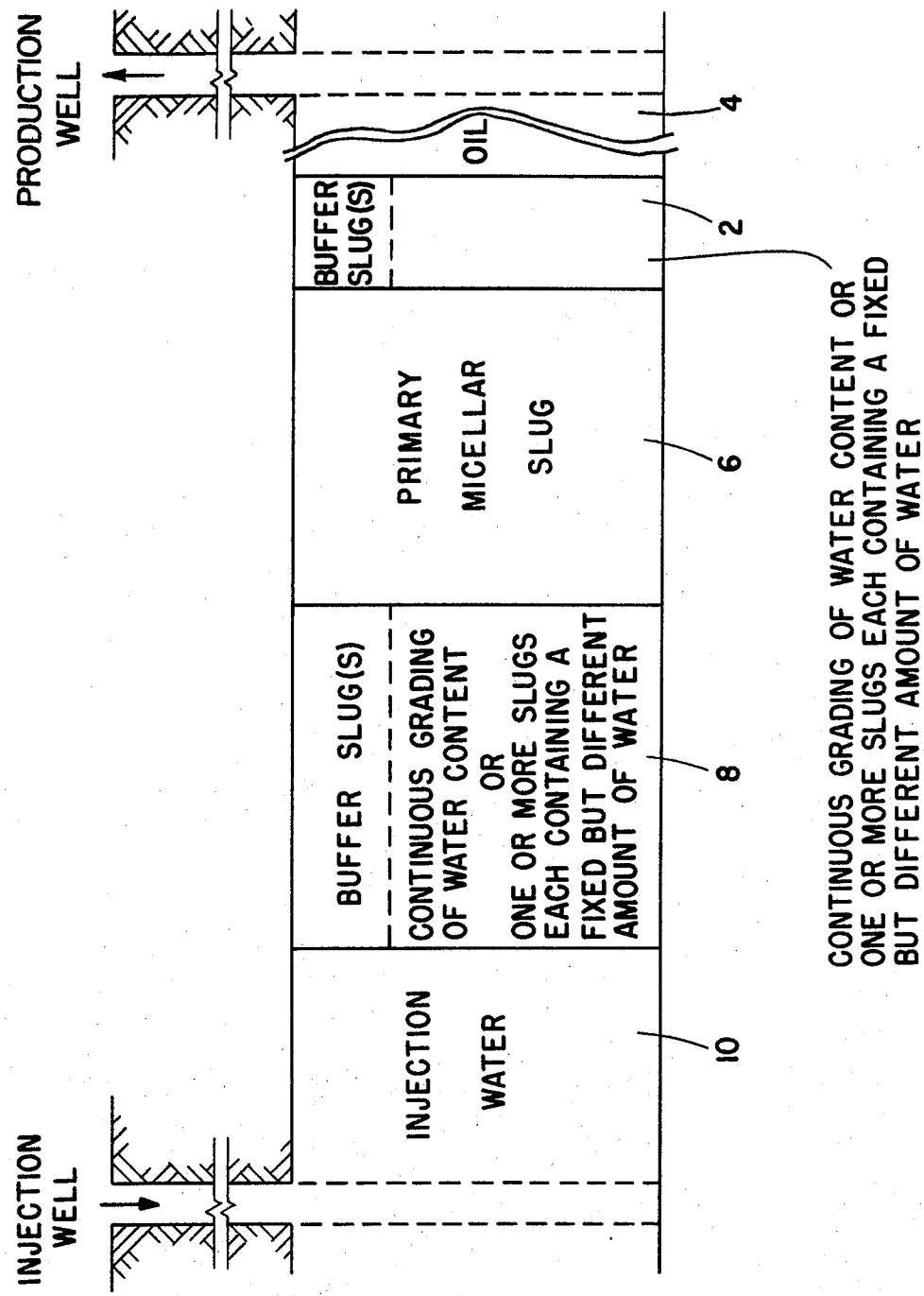

PROCESS FOR TREATMENT OF WATER INJECTION WELLS

INTRODUCTION

Our invention relates to the use of micellar solutions to improve the injectivity of water injection wells employed in oil recovery operations. It is particularly concerned with an improvement and novel method of treating such wells whereby the tendency of said solutions to form troublesome emulsions is held to a minimum, thus making possible the treatment of injection wells penetrating extremely low permeability (e.g., less than 20 md.) formations.

BACKGROUND OF THE INVENTION

The injectivity of water injection wells can be improved by utilizing a process capable of removing residual oil saturation and/or organic deposits from around the well bore. Restrictions in water injectivity occur in formations in which the permeability to water at residual oil saturation is a small percentage of the permeability at 100 percent water saturation. These percentages normally range from 2-15 percent for water-wet formations, 15-30 percent for intermediate-wet formations and 30-80 percent for oil-wet formations. Based upon radial flow calculations, two-fold injectivity improvements can be obtained by removing residual oil saturation out to about 45 feet in reservoirs where permeability to water is not more than about 10 percent of the absolute permeability.

Organic deposits, such as paraffins and asphaltenes, are present in some injection wells. Such deposits are usually never completely removed if the well was converted from a producer to an injection well. In addition, the initial injection of relatively cold water into the matrix around the well bore can result in paraffin precipitation in some reservoirs. If the well also contains a fracture or other stimulated condition, the presence of such deposits may not show up as a skin effect from pressure fall-off tests. The magnitude of injectivity improvements achieved by dissolving and dispersing organic deposits can, depending upon extent of the damage, lead to several-fold increases in injectivity.

The use of micellar solutions as a solvent or agent in injection well cleanout procedures has been known for some time but was practiced with indifferent success. More recently, the use of oil- and water-external micellar systems has been described in U.S. Pat. Nos. 3,467,188 and 3,474,865, respectively. Water-external systems naturally have lower solvent power for organic deposits such as paraffin and asphaltene normally found at or near the face of an injection well, and also are poor solvents for the trapped oil frequently present near the face of the injection well.

Provided that the rock permeability level is sufficiently high, a single micellar slug followed by water can be used to improve injectivity, i.e., the emulsion plugging effect, resulting from contact of the slug with the drive water, generally is tolerable. For low permeability rocks characteristic of the West Texas carbonate reservoirs, plugging of rock pores can occur, particularly in formations having permeabilities of the order of from about 1 to about 3 md., "Field Results of Injection Well Stimulation Treatments Using Micellar Dispersions," by J. P. Moran et al., Soc. Pet. Eng. of AIME, paper No. 2842. Such plugging apparently results when the single solvent slug contacts a large amount of water at the front end and when driving water rapidly mixes with the slug at its trailing edge. The water, being much more mobile than the slug, fingers through it and creates zones of high water saturation which in turn leads to the formation of plugging emulsions by excessive dilution of the single solvent slug. This latter effect could be reduced to some extent by driving with water containing mobility reducing polymers, but such practice is costly and the polymers themselves have a tendency to plug the rock.

DESCRIPTION OF THE INVENTION

We have found that the aforesaid water injection wells can be stimulated successfully by the use of a slug of an oil-external micellar solution wherein such solution is preceded and/or followed by at least one micellar slug of a higher water content and then followed finally by injection water as the drive agent. Also included within the scope of this invention is the practice of continuously grading from water — to oil-external slug — to drive water. The oil-external solution mentioned above is referred to herein as the "primary" slug and usually contains from about 5 to about 60 percent water. The other compositions are referred to herein as "buffer" slugs and may be applied by continuously grading the water content or by injecting distinct slug compositions. Improvements can also be obtained without use of a micellar buffer slug preceding the primary slug but employing at least one micellar solution of higher water content at the trailing edge of the solvent or primary slug. Generally, however, we prefer to use the high water content micellar solution at the front of the primary slug because contamination of the latter by in-place water is materially reduced, in turn reducing the possibility of undesirable emulsion formation. The use of such micellar solutions at the leading edge of the primary slug is desirable to prevent contamination of the slug when it is initially injected into the sand face. The desirability of these graded micellar solutions at the trailing edge of the primary slug is much greater, however, for at least two reasons. First, the graded solution at the primary slug's trailing edge protects the slug from contamination by the drive water and subsequent emulsion formation in the slug, thus maintaining relatively easy flow of the slug material through the formation. Being micellar solutions, the relatively high water content solutions, e.g., 70–90 percent, have a higher viscosity than the drive water, making them a more effective means to push the primary slug through the formation without causing bypassing of the drive water through and around the slug itself.

The non-aqueous portion of the micellar solution is referred to as the concentrate which consists essentially of a hydrocarbon, a surfactant and a cosurfactant. The concentrate may be modified by varying the ratios of ingredients therein and in some cases may be free of added hydrocarbons. The amount of micellar solution, including primary and buffer slugs, injected into the zone to be treated amounts to from about 0.5 to about 20 barrels per vertical foot of sand, corresponding to from about 0.2 to about 10 bbls of the concentrate.

The primary slug in order to obtain maximum effectiveness as an injectivity improver under a wide variety of reservoir conditions should possess the following characteristics. It should be oil external so that it will readily contact the organic phase and have the capability both of dissolving organic deposits and removing residual oil saturation. The slug may incorporate solvents such as kerosene or aromatic naphtha. Where asphaltene deposits are known to exist, a solvent of high aromatic content is preferred because of its increased ability to dissolve deposits of this kind. As an alternate procedure, small amounts of an additional solvent, such as ketones or carbon disulfide, may be added to the kerosene or equivalent to increase the ability of the micellar solution to dissolve or solubilize said deposits. Peptizing or dispersing agents may also be added. By incorporating these solvents in relatively small amounts, the usual problems of high vapor pressure and fire hazard are reduced.

To effectively increase injectivity the oil-external micellar slug should not only be miscible with oil but also should not be trapped by the drive water. Since the slug itself contains a high hydrocarbon content, trapping of the slug can leave a permanent oil saturation. In addition, if water is indiscriminately mixed with an oil-external micellar slug, a blocking emulsion may be formed. Such an adverse condition can occur in the rock due to fingering of water through the slug. In low permeability formations this can cause complete blocking. Experience has shown that while it is possible to design a micellar slug composition to minimize emulsification, it has not been possible to produce a composition that will resist emulsion formation entirely when indiscriminately mixed with large volumes of water. Formation plugging emulsions are avoided in the present invention by the use of the buffer slugs referred to above, which prevent direct dilution of the primary slug by large proportions of water.

Based on experimental and field data, we have observed that plugging of the formation immediately adjacent to the injection well can be avoided by the introduction of suitable buffer slugs to prevent the direct and rapid contact of the primary slug with connate and drive water. The buffer slug composition may be either a water diluted form of the primary slug, or essentially the equivalent thereof, or a specially blended high water content solution. For example, as the hydrocarbon to surfactant ratio is reduced, the solution will grade more smoothly to water, i.e., will be more emulsion free. Special blends may be prepared from concentrates having a low ratio of oil to chemical (surfactant and cosurfactant). The ratio of surfactant to cosurfactant may also be varied to achieve desired properties. Thus, for example, as the ratio of cosurfactant to surfactant is increased the system's resistance to emulsification increases. For this reason the cosurfactant to surfactant ratio in both the leading and trailing buffer slugs generally should be higher than that in the primary slug. With the higher cosurfactant-surfactant ratio the buffer slugs on contact with either formation water or drive water are more resistant to emulsion formation. The tendency of such systems to resist emulsion when the cosurfactant-surfactant ratio is increased is clearly demonstrated by the ternary diagrams shown in FIGS. 1 and 3 of U.S. Pat. No. 3,308,068.

The buffer slug may be prepared and injected batchwise, with each batch varying in water content. Alternatively, water may be added continuously during injection to achieve a smooth, controlled gradation in water content.

The micellar solution concentrate from which the primary and buffer slugs may be prepared is composed of a hydrocarbon solvent, a surfactant and a cosurfactant. As typical examples of these three components there may be mentioned, respectively, kerosene, a hydrocarbon sulfonate, and a mixture of an ethoxylated aliphatic alcohol having from four to 10 carbon atoms and a $C_5$ alcohol or fusel oil, the volume ratio of ethoxylated alcohol to $C_5$ alcohol or fusel oil ranging from about 2:1 to about 7:1. Fresh water with added sodium chloride or equivalent salt is blended at the well site to form the final micellar solution mixtures. The solutions are miscible with most reservoir crude oils, with fresh water, and, in general, are stable at temperatures ranging from 32° F. to about 200° F. One composition may thus be used in many different reservoir applications, the main consideration being the salinity of the available water supply. These solutions may be used in reservoirs of any permeability level but the process of our invention is especially applicable to the very low permeability reservoirs, i.e., under 20 md. For low permeability applications the process of our invention typically employs the following sequence of compositions and injection steps:

| Step No. | Inject: |
|---|---|
| 1 | Highest water content buffer slug (70–95% water) |
| 2 | Intermediate water content buffer slug (40–80% water) |
| 3 | Oil-external micellar slug (5–60% water) |
| 4 | Intermediate water content buffer slug (40–80% water) |
| 5 | Highest water content buffer slug (70–95% water) |
| 6 | Water Injection |

Since each fluid is compatible with the other fluids that are contacted, no severe emulsions are formed at any point in the system.

The number and volume of the buffer slugs and the volume of the primary slug may be adjusted to best meet the individual requirements of a particular reservoir. Tight formations such as occur in West Texas limestones may require two or more buffer slugs before and after the primary slug. For formations where organic deposits are a known problem, a larger than normal volume of the primary slug may be injected for maximum benefits. Where it is desired to remove oil saturation from the largest possible area around the well bore, larger than normal volumes of the buffer slugs may be employed.

Both the amount and type of salt present in the primary slug have a substantial influence on its properties. Transparent solutions are formed within a certain limit of salinity in the water. At low salt levels, typically under 5,000 ppm, solutions are often clear but viscous, hazy or emulsified. The preferred transparent solutions typically occur in salt concentration ranges of from about 5,000 to about 20,000 ppm. The desired salt level of water in buffer slugs is less than for the primary slug. The experimental data indicate that the salt level required to achieve transparent high water solutions decreases linearly as the water content is increased.

The process of our invention may be very readily applied in the field. The non-aqueous components, i.e., hydrocarbon solvents, sulfonate, and cosurfactant, may be blended at a convenient location, such as at a refinery. The mixture may then be transported to the well which is to be treated and water in the correct proportion is then blended to form the desired primary slug composition. Water is then added and mixed in with the primary slug or to a part of the non-aqueous mixture in an amount to form the desired buffer slug composition. Solutions should then be filtered and injected into the reservoir in the proper sequence.

In some cases where the salt content of the in-place water is greater than about 5,000 ppm, we have found it desirable to inject initially a slug of fresh water (such as potable water), usually from about 0.5 to 5 barrels per vertical foot of formation to be treated. While the latter salt content of the injection water applies to formations having a permeability not greater than about 20 md., formations having permeabilities of at least 100 md. can tolerate the use of waters, the salt content of which may be as high as 30,000 ppm, before the use of fresh water slugs, as described herein, are generally needed. A preflush is particularly desirable to displace waters containing several hundred ppm of divalent cations. This procedure aids in protecting the leading buffer solution(s) as well as the primary slug from the possibility of salt contamination and subsequent emulsification which in turn causes formation plugging. The leading buffer solution can withstand high salt concentrations much better than the primary slug which contains appreciably more of the micellar concentrate. With the presence of the fresh water bank ahead of the buffer solution, however, the entire system of micellar solutions is protected from emulsification and the subsequent plugging of the formation. Likewise, it may be desirable to place a slug of fresh water back of the most dilute trailing buffer slug and just in front of the injection water where the latter has an objectionably high salt content. In cases where water-sensitive formations are involved, we prefer to initially commingle fresh water with a relatively small amount of injection water, followed by a slug of fresh water.

Although only a single micellar slug injection may be adequate for the higher permeability level rocks, certain advantages in cost or effectiveness can be derived by employing one or more buffer slugs in accordance with our invention. The buffer slugs, although not very effective in dissolving organic deposits, are generally effective in removing residual oil saturation and avoid entirely the trapping of the micellar slug. Buffer slugs, because of their much higher water content, are cheaper than the primary slug. Consequently, for a given fluid cost, a greater volume of the reservoir can be effectively contacted. Conversely, for a given volume of rock swept, the amount and cost of slug materials required are reduced.

While oil-external micellar solutions generally known to the art may be used in carrying out the process of our invention, micellar solutions considered particularly applicable are those described in U.S. Pat. Nos. 3,126,952 and 3,308,068 and in copending U.S. Ser. No. 848,682, filed Aug. 8, 1969 by Loyd W. Jones et al. Typical of the compositions taught therein comprise a $C_{10}$ to $C_{12}$ hydrocarbon mineral oil, a cosurfactant such as diethylene glycol mono-hexyl ether and a surfactant such as a petroleum mahogany alkali metal sulfonate, in which the weight ratio of the sulfonate to the mono-hexyl ether ranges from about 7:3 to about 1:9. Another type of primary slug may typically consist essentially of an alkali metal petroleum sulfonate or a synthetic hydrocarbon sulfonate having an average molecular weight of from about 350 to about 600, a cosurfactant consisting of from 2–12 mols of an ethylene oxide adduct of a primary alcohol having from four to 10 carbon atoms, the ratio of the sulfonate to cosurfactant ranging from about 3:1 to about 6:1, the combination of sulfonate and cosurfactant being present in a combination ranging from about 8 to about 30 weight percent; from about 2 to about 20 weight percent of a hydrocarbon oil, e.g., kerosene, and not more than about 95 weight percent water which may range in salinity from that of distilled water up to about 20,000 ppm of a salt of a monovalent cation.

DESCRIPTION OF A PREFERRED EMBODIMENT OF THE INVENTION

In the accompanying drawing a buffer slug is injected into the input well to establish a bank 2 next to formation oil bank 4. The leading edge of bank 2 contains the highest concentration of water. This fluid is generally capable of removing residual oil saturation but is relatively ineffective in removing organic skins in the vicinity of the well bore. The interfacial tension between the oil and bank 2 is very low, e.g., about 0.01 dyne/cm. The water content of bank 2 decreases as the primary micellar slug 6 is approached. This change in water content, as previously mentioned, may be either gradual or in the form of a series of distinct slugs — of fixed but different concentration — increasing in amount of the non-aqueous phase in the direction of the primary micellar slug 6. Sufficient concentrated (50 percent non-aqueous phase) micellar solution is introduced via the injection well to form the primary solvent slug 6. Thereafter, a second buffer slug is added through the injection well, usually in an amount corresponding to from about 2 to 4 times the volume of bank 2, resulting in the formation of buffer bank 8. Following the latter, injection water 10 is introduced, forcing the aforesaid slugs through the formation in banks which tend to dissipate after they have moved out from the injection well a substantial distance, e.g., 25 to 30 feet. Under these conditions any organic deposits on the well bore face as well as residual oil saturation in the vicinity of the well bore are dissolved and carried in dilute form out in the formation. Water injection can then be continued at an injection rate substantially increased over that possible prior to treatment.

The process of our invention will be further illustrated by the examples which follow. The data appearing herein are based on both laboratory and field work. In the laboratory investigation the formation core under test was first saturated with water, then with oil to establish an oil saturation. Thereafter, the core was subjected to waterflooding with a representative brine solution (<2,000 ppm total salts). In the case of the core subjected to the process of our invention, two buffer slugs of the indicated composition were used before and after the primary slug composition. In this case the buffer slugs were prepared from the primary slug.

| Run No. | Core | Initial saturations | | Primary slug composition | Buffer slugs | Driving brine | Permeabilities, md. | | |
|---|---|---|---|---|---|---|---|---|---|
| | | Oil | Brine | | | | Initial | Residual oil | Final |
| 1 | Fired berea. | Level-land. | 1,000 p.p.m. salt. | 18.92% petroleum hydrocarbon sodium sulfonate, 28.38% kerosene, 47.3% water plus 1% NaCl, 5.3% *Cosurfactant. | None | 1,000 p.p.m. salt. | 347 | 53 | 273 |
| 2 | Vohuro | Level-land. | 1,000 p.p.m. salt. | 19.25% petroleum hydrocarbon sodium sulfonate, 28.87% kerosene, 48.12% water plus 1% NaCl, 3.75% **Cosurfactant. | None | 1,000 p.p.m. salt. | 2.4 | .329 | .353 |
| 3 | Level-land. | Level-land. | 1,000 p.p.m. salt. | 16.99% petroleum hydrocarbon sodium sulfonate, 31.55% kerosene. 48.54% .1 N NaCl plus 292 p.p.m. CaCl. 2.92% ***Cosurfactant. | 80% H$_2$O, 20% primary slug. 40% H$_2$O, 60% primary slug. | 1,000 p.p.m. salt. | 4.6 | 1.35 | 3.7 |

*6 mol ethylene oxide adduct of 1-hexanol plus isoamyl alcohol, mol ratio 1:1.
**Same as in Run No. 1 except the ratio of 6 mol adduct to isoamyl alcohol was 3.5:1.
***6 mol adduct plus fusel oil in ratio of 1.84:1.

Although the slug compositions employed in the above example varied slightly from one another, such minor differences are not considered to affect the conclusions made from the data obtained. Test results show that in the higher permeability Berea core (347 md initial permeability) a single slug driven by water was successful in restoring 80 percent of the initial permeability. Although we did not employ our invention in treatment of the same kind of core, we anticipate that the use of buffer slugs as taught herein would lead to further improvement in this permeability level rock. In the lower permeability rocks where injectivity problems are most severe, the advantage of the use of buffer slugs is demonstrated. Thus, in addition to the tests cited in the above Table, i.e., Run No. 2, plugging or lack of any improvement was observed in five other low permeability rock tests utilizing a single oil-external micellar solution. Run No. 3 demonstrates the improvement in low permeability rock achieved by the process of our invention in which the oil saturated core was restored to approximately 80 percent of its initial permeability.

In the field operations the micellar concentrate was delivered and stored in a clean 300-barrel tank. Fresh water was brought to the well location in clean acid transport trucks. Preparation of the three micellar solutions, i.e., the primary slug and two buffer slugs of varying water content, was carried out in a tank having two 250-barrel compartments and in a 96-barrel acid transport tank. The mixing procedure consisted of initially placing a quantity of fresh water in the proper tank, adding and circulating into solution a prescribed quantity of sodium chloride and finally blending in the required amount of the micellar concentrate. All fluids were filtered before use.

EXAMPLE I

At the time of treatment this well — located in the Levelland Unit of the Levelland Field, Texas — had a water injection capacity of 445 barrels per day at 1,000 psi. The micellar concentrate employed had the following composition:

65.1 weight percent kerosene
27.9 weight percent petroleum hydrocarbon sodium sulfonate (molecular weight about 440)
7 weight percent cosurfactant made up of the 6 mol ethylene oxide adduct of 1-hexanol, and fusel oil; these two components of the cosurfactant being present in a volume ratio of 6:1

From the above composition the primary slug was prepared by mixing 45 bbls of the concentrate with 45 bbls of fresh water (Ogallala water) containing 12,000 ppm of added sodium chloride. The leading buffer slug (90 percent water) was prepared from 8 bbls of the concentrate and 72 bbls of fresh water containing 4,000 ppm of added sodium chloride. The second buffer slug (70 percent water) was formulated from 15 bbls of the concentrate and 35 bbls of fresh water containing 8,000 ppm of added sodium chloride.

After these solutions were prepared they were injected — in a volume corresponding to 1 ½ bbls of concentrate per vertical foot of formation — into the well in accordance with the following sequence and in the volumes stated. After this the following injection procedure was employed:

1. Injected 15 bbls of Buffer Slug I (90 percent water)
2. Injected 15 bbls of Buffer Slug II (70 percent water)
3. Injected 90 bbls of primary micellar slug (50 percent water)
4. Injected 35 bbls of Buffer Slug II (70 percent water)
5. Injected 65 bbls of Buffer Slug I (90 percent water)
6. Resumed normal injection Following treatment the water injectivity capacity was observed to increase to 505 barrels per day at 1,000 psi. More than three months after treatment the well still retained this same increase in injection rate, representing a gain of about 14 percent over the before-treatment injection capacity.

EXAMPLE II

A well in the Northwest Mallet Unit of the Slaughter Field, Texas, having an initial injection capacity of 100 barrels per day at 1,300 psi was treated with micellar solutions of the same composition and in accordance with the same procedure as described in Example I. The volumes of micellar solutions used were the same as those shown in Example I, differing only in salt content. From the concentrate, the primary slug (50 percent water) was prepared by mixing 45 bbls of the concentrate with 45 bbls of fresh water containing 13,000 ppm added sodium chloride. The leading buffer slug (90 percent water) was formulated by mixing 8 barrels of concentrate with 72 barrels of fresh water containing 3,500 ppm sodium chloride. The second buffer slug (70 percent water) consisted of 15 bbls of the concentrate mixed with 35 bbls of fresh water containing 7,500 ppm added sodium chloride.

After these solutions were prepared they were injected — in a volume corresponding to 1 ½ bbls of concentrate per vertical foot of formation — into the well in accordance with the following sequence and in the volumes stated:

1. Injected 100 bbls of fresh water into the zone to be treated for a period of 24 hours to protect the micellar solutions from the highly saline water already injected into the formation and which was to be injected after treatment.
2. Injected 15 bbls of Buffer Slug I (90 percent water)
3. Injected 15 bbls of Buffer Slug II (70 percent water)
4. Injected 90 bbls of primary micellar slug (50 percent water)
5. Injected 35 bbls of Buffer Slug II (70 percent water)
6. Injected 65 bbls of Buffer Slug I (90 percent water)
7. Injected 100 bbls of fresh water over a 24-hour period
8. Resumed normal injection Following treatment the water injectivity capacity was observed to increase to 125–130 barrels per day at 1,340 psi. More than 3 months following treatment the well still retained this same increase in injection rate, representing an increase of about 25–30 percent of the before-treatment injection capacity.

EXAMPLE III

A second well in the Levelland Unit of the Levelland Field, Texas, having an initial injection capacity of 650 barrels per day at 1,000 psi was treated with micellar solutions of the same composition and in accordance with the same procedure as described in Example I above. The volumes of micellar solutions used differed from those shown in the previous examples as follows.

| | |
|---|---|
| Primary Slug: | Mixed 140 bbls of concentrate with 140 bbls fresh water containing sufficient sodium chloride to give a salt concentration of 12,000 ppm. |
| Buffer Slug No. I: | Mixed 23 bbls of concentrate with 207 bbls fresh water containing sufficient sodium chloride to give a salt concentration of 4,000 ppm. |
| Buffer Slug No. II: | Mixed 47 bbls of concentrate with 110 bbls of fresh water containing sufficient sodium chloride to give a salt concentration of 8,000 ppm. |

After these solutions were prepared they were injected (3 barrels per vertical foot) into the formation being treated in accordance with the following sequence and in the volumes stated.

1. Injected 20 bbls of Buffer Slug I
2. Injected 20 bbls of Buffer Slug II
3. Injected 280 bbls of the primary slug
4. Injected 137 bbls of Buffer Slug II
5. Injected 210 bbls of Buffer Slug I
6. Resumed fresh water injection Immediately following treatment the water injectivity capacity was observed to increase to 710 barrels per day at 1,000 psi. More than 3 months after treatment the well still retained this same increase, representing an improvement of about 11 percent over the before-treatment injection capacity.

EXAMPLE IV

This example illustrates the difference in results obtained when a water injection well is treated with a primary slug without the benefit of buffer slugs and wells treated in accordance with the process of the present invention. This well was located in the Levelland Unit of the Levelland Field, Texas, and had an initial water injection capacity of 390 barrels per day at 855 psi. The micellar solution employed as the primary slug had a composition comparable to that described in U.S. Pat. No. 3,467,188. The micellar solution was prepared from 140 bbls of the concentrate and 140 bbls of fresh water. The resulting slug was then injected into the formation being treated in an amount corresponding to 2.4 bbls of concentrate per vertical foot of oil-bearing formation. The micellar solution was then forced out into the formation by injection of fresh water. Following treatment the water injectivity capacity was first shown to be 330 barrels per day at 840 psi, and approximately 1 month thereafter had increased to 400 barrels of water per day at 835 psi, representing an increase of about 2.5 percent over the before-treatment injection level.

In all of the above examples the matrix permeability was less than 5 md, and with the oil saturation present the actual permeability to water was not more than 1 md.

We claim:

1. In the injection of a water stream through an injection well into a porous subsurface formation containing a water immiscible phase which is resistant to displacement by water flow and which substantially restricts the flow of water through the formation, the improvement which comprises:

removing said water immiscible phase and thereby increasing the injectivity of said formation to water with a resulting substantial increase in the rate of water injection by injecting into the formation a micellar slug (II) followed by injection into said formation of a primary oil-external micellar solution in an amount sufficient to displace said water immiscible phase out into said formation, said micellar slug (II) having a water content greater than that of said primary oil-external solution;

following the injection of said oil-external solution with a micellar slug (I) of substantially increased water content, thereby displacing said water immiscible phase by said oil-external solution into the region about the well bore;

thereafter injecting water into said well and into said formation in sufficient amount to displace said oil-external micellar solution and said micellar slug (I) farther out into said formation and saturating said region in turn with water, and continuing said water injection at a substantially increased rate.

2. The process of claim 1 wherein micellar slug (II) is graded in concentration, being most dilute with respect to the non-aqueous phase thereof at the leading edge of slug (II).

3. The process of claim 2 wherein micellar slug (I) at the trailing edge of said primary oil-external solution is graded in concentration, being most dilute with respect to the non-aqueous phase thereof at the trailing edge of micellar slug (I).

4. The process of claim 3 wherein the total volume of the non-aqueous phase employed in said primary solution and in slugs (I) and (II) and injected into said formation amounts to from about 0.2 to about 10 barrels per vertical foot of formation treated.

5. The process of claim 1 wherein a slug of fresh water in an amount sufficient to form a bank thereof is injected into said formation before micellar slug (II) and after micellar slug (I).

6. The process of claim 1 wherein said primary oil-external solution contains from about 5 to about 60 percent water and slugs (I) and (II) contain more than 60 percent but not more than about 95 percent water, slugs (I) and (II) being most dilute with respect to the non-aqueous phase thereof at the trailing and leading edges, respectively.

7. The process of claim 1 wherein the total volume of the non-aqueous phase employed in said primary solution and in slugs (I) and (II) and injected into said formation amounts to from about 0.2 to about 10 barrels per vertical foot of formation treated.

8. The process of claim 1 wherein slugs (I) and (II) are injected batchwise into the formation.

9. The process of claim 1 wherein water is added continuously to produce slugs (I) and (II) of variable water contents during their injection into the formation.

10. The process of claim 1 wherein slugs (I) and (II) have a lower hydrocarbon to surfactant ratio than said primary oil-external solution.

11. The process of claim 1 wherein the ratio of the total weight of inorganic salts to the weight of total water in slugs (I) and (II) is lower than in the oil-external solution.

12. The process of claim 1 wherein the cosurfactant to surfactant ratio in slugs (I) and (II) is greater than that in the primary oil-external solution.

13. In the injection of a water stream through an injection well into a porous subsurface formation containing a water immiscible phase which is resistant to displacement by water flow which substantially restricts the flow of water through the formation and wherein the inplace water in said formation has a salt content in excess of about 5,000 ppm, the improvement which comprises:

removing said water immiscible phase and thereby increasing the injectivity of said formation to water with a resulting substantial increase in the rate of water injection by first injecting a slug of fresh water into said formation;

thereafter injecting into the formation a primary oil-external micellar solution in an amount sufficient to displace said water immiscible phase out into said formation;

following the injection of said oil-external solution with a micellar slug (I) of substantially increased water content over said oil-external solution, thereby displacing said water immiscible phase by said oil-external solution into the region about the well bore;

thereafter injecting water into said well and into said formation in sufficient amount to displace said oil-external micellar solution and said micellar slug (I) farther out into said formation and saturating said region in turn with water; and continuing said water injection at a substantially increased rate.

* * * * *